United States Patent [19]

Cruse

[11] 4,058,223
[45] Nov. 15, 1977

[54] ARTICLE HANDLING DEVICE

[75] Inventor: Bernd Cruse, Staatsburg, N.Y.

[73] Assignee: International Business Machines Corporation, Armonk, N.Y.

[21] Appl. No.: 588,531

[22] Filed: June 19, 1975

[51] Int. Cl.² .................................................. F01B 19/02
[52] U.S. Cl. ..................................... 214/1 BB; 92/99; 92/101; 193/32; 198/345; 198/486; 198/736; 221/298; 294/99 R; 302/2 R; 408/70
[58] Field of Search ............... 214/1 BB, 1 B, 310, 214/309, 1 CM, 1 BE, 35 R; 92/98 R, 99, 101, 96, 100; 294/99 R, 63 A; 200/38 A, 38 B, 38 P, 38 Q; 198/345, 485, 736; 193/32, 40; 302/2 R, 29, 31; 221/298; 408/14, 70; 10/165; 251/331, 61

[56] References Cited

U.S. PATENT DOCUMENTS

| 2,604,574 | 7/1952 | Riddell | 214/8.5 K X |
|---|---|---|---|
| 2,817,727 | 12/1957 | Schmeling | 92/101 X |
| 2,900,915 | 8/1959 | Rowell | 200/83 P X |
| 2,937,788 | 5/1960 | Darsie | 221/298 |
| 3,121,552 | 2/1964 | Wilson | 200/83 Q X |
| 3,613,518 | 10/1971 | Prosser | 92/99 X |
| 3,898,403 | 8/1975 | Grayson | 200/83 Q |

FOREIGN PATENT DOCUMENTS

| 515,632 | 12/1952 | Belgium | 251/331 |
|---|---|---|---|
| 2,406,341 | 2/1974 | Germany | 251/331 |

Primary Examiner—Robert J. Spar
Assistant Examiner—George F. Abraham
Attorney, Agent, or Firm—Frank C. Leach, Jr.; Henry Powers

[57] ABSTRACT

A pin is integral with a diaphragm and extends from one side of the diaphragm. The other side of the diaphragm is subjected to a pressure or vacuum to create a pressure differential across the diaphragm to move the pin into or out of engagement with an article within a controlled environment. The diaphragm isolates a fluid, which produces the pressure differential across the diaphragm, from the controlled environment. In one embodiment, the pin is formed at the center of the diaphragm and moves only in a straight line. In another embodiment, the pin is formed eccentric to the center of the diaphragm so as to have a combination movement of angular and straight. The pin can be employed to stop an article such as a semiconductor wafer, for example, or to raise or to lower the wafer without the actuating fluid contaminating the controlled environment in which the semiconductor wafer is disposed.

17 Claims, 11 Drawing Figures

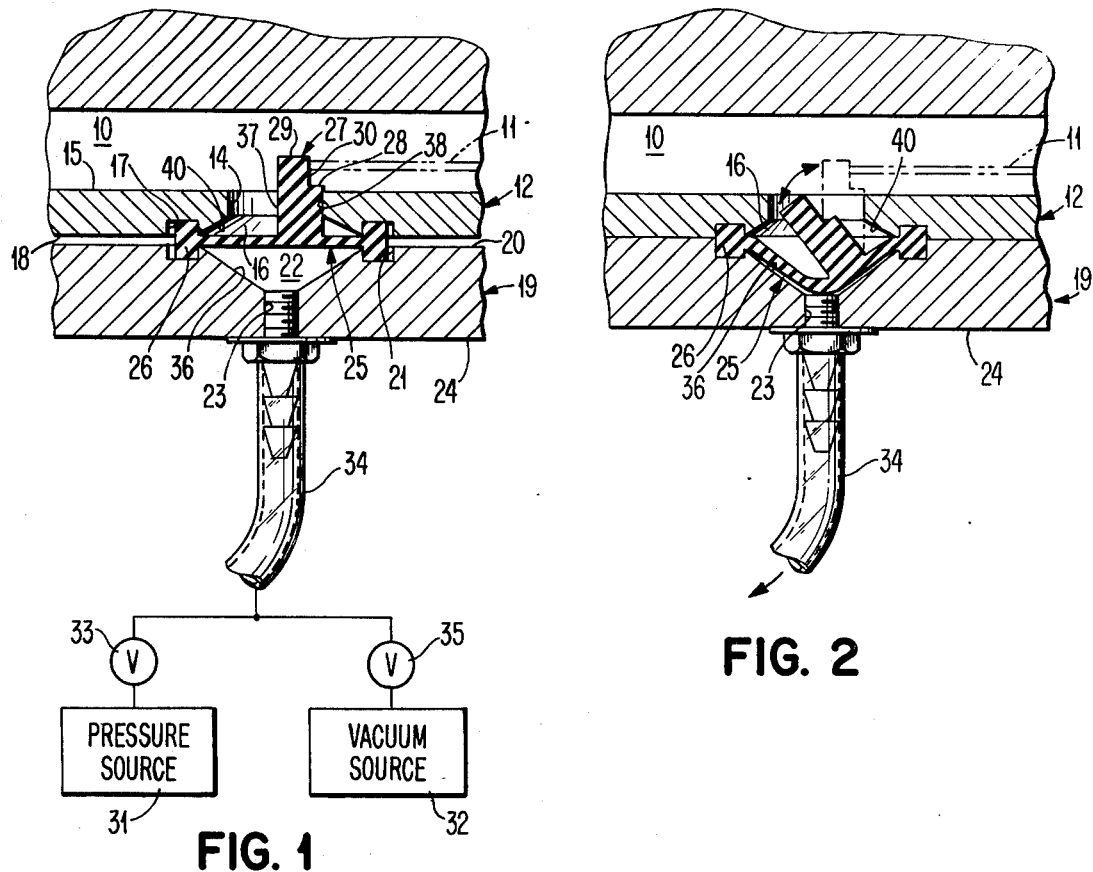
FIG. 1
FIG. 2
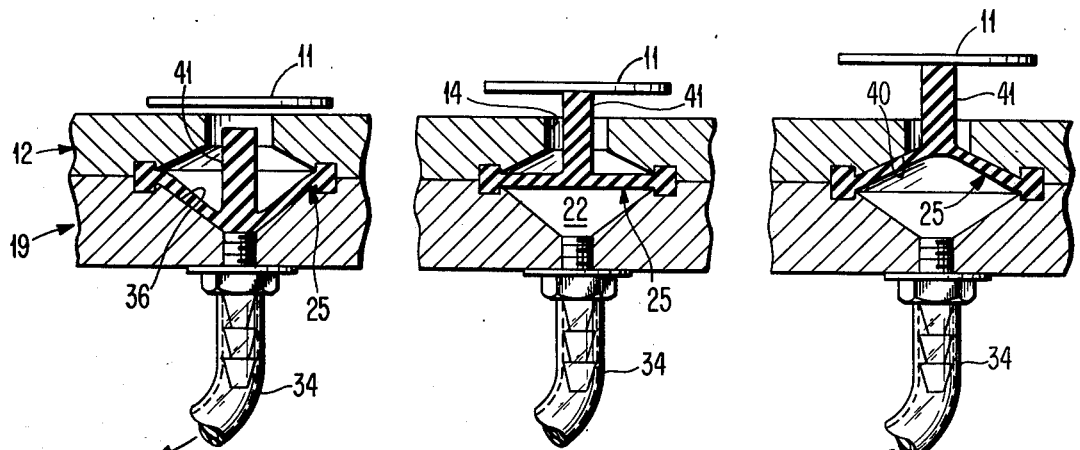
FIG. 3A  FIG. 3B  FIG. 3C

ARTICLE HANDLING DEVICE

In processing semiconductor wafers, it is necessary that the wafers be maintained in a controlled environment in which they are not contaminated. Thus, the wafers, which can be moved along an air slide or track between various positions, for example, must be stopped at various positions during their movement and possibly raised or lowered when held in a certain position at which a processing step occurs.

Furthermore, when disposed at a particular processing location, it is necessary that the wafer be maintained at a desired fixed position during this processing. The pressurized air in the air slide or track would keep the wafer moving if it is not positively held in the desired position.

It also is necessary that the pressure with which the wafer is retained at a desired position by the retaining means be controlled so that there is no damage to the wafer when it is stopped or held at the desired position. It also is necessary that the wafer be held without any damage to its edges and that the processing surface not be contacted.

The article handling device of the present invention satisfactorily meets the foregoing requirements through providing an element movable relative to the article to be handled. The element is preferably a pin, which is formed of a suitable resilient material such as silicone rubber, for example, so that it will not damage the wafer when it engages therewith.

Additionally, the element is supported so that the actuating fluid for moving the element relative to the article is isolated from the clean or controlled environment in which the article is disposed. At the same time, this support enables the element to be moved so as to be capable of lifting, lowering, or stopping the article to be handled.

The present invention accomplishes this by preferably forming the pin integral with a diaphragm to which either a vacuum or a pressure is supplied on the side remote from the pin to create a pressure differential across the diaphragm. Furthermore, by forming the pin off center of the diaphragm, the motion of the pin is both angular and straight so that the pin does not have any sliding contact with the edge of the article when moved into or out of engagement with the article.

Through controlling the pressure or vacuum applied to the diaphragm along with limiting the motion of the diaphragm when the pressure or the vacuum is applied thereto, the pin engages the article with a controlled grasping force. This insures that there is no damage to the article when it is a semiconductor wafer, for example, and it is grasped by the pin of the present invention for stopping, lifting, or lowering. Of course, the lifting or lowering of the article requires a plurality of the pins of the present invention with each being separately actuated.

An object of this invention is to provide a device for handling an article.

Another object of this invention is to provide a device for controlling the force with which an article is grasped.

A further object of this invention is to provide a device for controlling the movement or orientation of an article.

The foregoing and other objects, features, and advantages of the invention will be apparent from the following more particular description of preferred embodiments of the invention as illustrated in the accompanying drawings.

In the drawings:

FIG. 1 is a fragmentary sectional view of one form of the article handling device of the present invention prior to completing assembly thereof.

FIG. 2 is a fragmentary sectional view, similar to FIG. 1, of the article handling device of the present invention assembled.

FIGS. 3A-3C are fragmentary sectional views of another form of the article handling device of the present invention with the article engaging pin being centered with respect to its support and showing the pin in various positions.

Figure 4A:
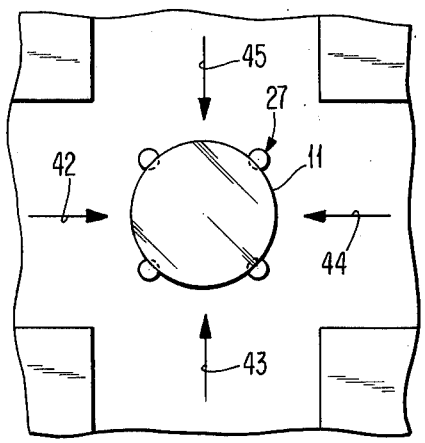
FIG. 4A is a schematic top plan view of an arrangement of a plurality of the article engaging pins of the present invention for centralizing the location of an article.

Referring to the drawings and particularly FIGS. 1 and 2, there is shown a chamber 10, which has a controlled or clean environment, for example, so that it is a clean air chamber. The chamber 10 can have an air slide therein of the type shown in U.S. Pat. No. 3,706,475 to Yakubowski, for example, for moving an article 11 such as a semiconductor wafer, for example, therein. A plate 12, which would have the air passages (not shown) therein to support and move the article 11 in the manner shown and described in the aforesaid Yakubowski patent, forms the bottom wall of the chamber 10.

The plate 12 is formed with a slot 14 in its upper surface 15 to provide communication between the chamber 10 and a chamber 16 in the plate 12. An annular groove 17 is formed in a lower surface 18 of the plate 12 and surrounds the bottom of the chamber 16. The chamber 16 may have any convenient shape. Thus, the chamber 16 may be circular or cone shaped, for example.

A plate 19 is disposed beneath the plate 12 and has its upper surface 20 engaging the lower surface 18 of the plate 12 when the plates 12 and 19 are secured to each other as shown in FIG. 2. An annular groove 21 is formed in the upper surface 20 of the plate 19 and aligned with the annular groove 17 in the lower surface 18 of the plate 12.

The annular groove 21 surrounds the top of a chamber 22, which may have any convenient shape. Thus, the chamber 22 may be circular or cone shaped, for example. The chamber 22 is aligned with the chamber 16 in the plate 12. The chamber 22 decreases in size from the upper surface 20 of the plate 19 until it communicates with a threaded passage 23 in the plate 19. The passage 23 extends to lower surface 24 of the plate 19.

A round or circular diaphragm 25 has an enlarged rim 26 on its periphery for disposition in the annular groove 17 in the plate 12 and the annular groove 21 in the plate 19 as shown in FIG. 1. The diaphragm 25 is formed of a suitable resilient or elastic material that returns to its rest position when no pressure is applied thereto. One suitable example of the material of the diaphragm 25 is silicone rubber.

When the plates 12 and 19 are connected to each other as shown in FIG. 2, the depths of the annular grooves 17 and 21 are such that the rim 26 is slightly compressed to form a tight seal without any distortion of the diaphragm 25. Thus, the diaphragm 25 remains substantially horizontal when the plates 12 and 19 are secured to each other.

The diaphragm 25 has a pin 27 extending upwardly therefrom through the chamber 16 and the slot 14 into the chamber 10. The pin 27 is preferably formed integral with the diaphragm 25 and of the same material as the diaphragm 25. The pin 27 has a shoulder or stop 28 therein to form a reduced portion 29 having a flat side 30 for engaging the article 11.

The pin 27 is disposed in the position of FIG. 1 and the phantom line position of FIG. 2 when the chamber 22 has neither pressurized air supplied thereto from a pressure source 31 or a vacuum applied thereto from a vacuum source 32. The pressure source 31 is connected to the chamber 22 through a valve 33 and a conduit 34, which is connected to the passage 23 in the plate 19. The vacuum source 32 is connected through a valve 35 to the conduit 34 to apply a vacuum to the chamber 22. It should be understood that the valves 33 and 35 can be replaced by a single four-way valve if desired.

As shown in FIG. 2, the application of the vacuum through opening the valve 35 causes the diaphragm 25 to be pulled downwardly to move the pin 27 out of engagement with the article 11 to enable the article 11 to be advanced within the chamber 10. The motion of the pin 27 is both an angular or tilting motion and a downward movement. The amount of motion of the diaphragm 25 is limited by its engagement with a downwardly inclined wall 36 of the chamber 22 as shown in FIG. 2.

The angular or tilting motion of the pin 27 enables the pin 27 to be moved into engagement with the edge of the article 11 or out of engagement therewith without any sliding motion relative thereto. Thus, there is minimum friction therebetween.

With the pin 27 having its enlarged circular or round portion 37 engaging an arcuate portion of wall 38 of the slot 14, the application of pressure from the pressure source 31 through the conduit 34 to move the diaphragm 25 upwardly does not cause any angular motion of the pin 27 but only an upward motion. Thus, the pin 27, even though mounted eccentrically from the center of the diaphragm 25, has no angular motion when pressure is supplied to the chamber 22 from the pressure source 31 with the slot 14 designed to contact the pin 27 as shown in FIG. 1. However, if desired, the slot 14 could be designed to permit tilting or angular motion of the pin 27 in addition to straight motion when pressure is applied to the diaphragm 25 from the pressure source 31.

The upward motion of the pin 27 by the upward movement of the diaphragm 25 is limited by the diaphragm 25 engaging an upwardly inclined wall 40 of the chamber 16. Thus, this controls the upward movement of the diaphragm 25 and, therefore, the amount of upward movement of the pin 27.

If desired, the diaphragm 25 can have a pin 41 (see FIGS. 3A-3C) disposed centrally thereof in place of the pin 27. The pin 41 is a cylinder of constant diameter and is used only for raising or lowering the article 11. Separate stop means such as vacuum stops, for example, would have to be employed to stop the article 11.

The pin 41 is preferably formed integral with the diaphragm 25. With the pin 41 disposed at the center of the diaphragm 25, the pin 41 moves only in a straight line. As shown in FIGS. 3A-3C, this is a motion only in the vertical direction. The conduit 34 is connected to the pressure source 31 and the vacuum source 32 in the same manner as in the modification of FIGS. 1 and 2.

When the vacuum source 32 applies a vacuum to the chamber 22 as shown in FIG. 3A, the diaphragm 25 moves downwardly to dispose the pin 41 within the slot 14 so that the article 11 is not engaged by the pin 41 and the article 11 can advance to the next processing station, for example, within the chamber 10 without rubbing engagement with the top of the pin 41. The downward motion of the diaphragm 25 is limited by the wall 36 of the chamber 22 in the same manner as discussed with respect to FIGS. 1 and 2 and as shown in FIG. 3A. The pin 41 must be in this position until the article 11 is stopped at the position at which it is to be raised.

If the pin 41 is exterior of the plate 12 when the diaphragm 25 is in its rest position as shown in FIG. 3B, then the upward motion of the pin 41 merely provides a greater lifting of the article 11. The upward motion of the pin 41 by the diaphragm 25 being raised upwardly due to the pressure source 31 supplying pressurized fluid to the chamber 22 is limited by the diaphragm 25 engaging the wall 40 of the chamber 16 in the same manner as discussed with respect to FIGS. 1 and 2 and as shown in FIG. 3C.

Figure 6A:
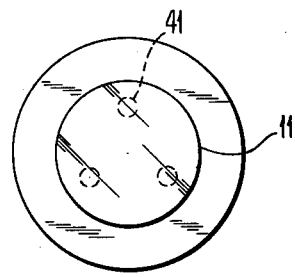
FIG. 6A is a schematic top plan view showing a plurality of the article handling pins for raising or lowering an article.
Figure 6B:
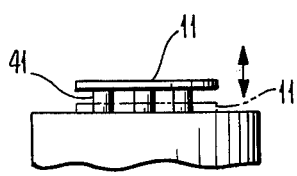
FIG. 6B is a schematic side elevational view of the arrangement of FIG. 6A.

With three of the pins 41, for example, equally angularly spaced from each other in the manner shown in FIG. 6A, then the article 11 could be raised when the vacuum source 32 stops the application of a vacuum to the three diaphragms 25 connected to the three pins 41. A further lifting occurs if the pressure source 31 supplies pressure to the three diaphragms 25 connected to the three pins 41.

Likewise, the article 11 could be first lowered by stopping the pressure to the chamber 22 for each of the diaphragms 25. A further lowering of the article 11 occurs when a vacuum is applied to the chamber 22 for each of the diaphragms 25. As previously mentioned, it is necessary to position the article 11 at this position by suitable stop means.

Figure 4B:
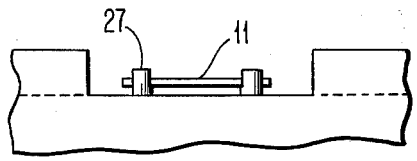
FIG. 4B is a schematic side elevational view of the arrangement of FIG. 4A and showing two of the pins in engagement with the article.

Referring to FIGS. 4A and 4B, there is shown an arrangement for centering the article 11 through utilization of four of the pins 27 and the connected diaphragms 25. Thus, in this arrangement, the article 11 could be directed in any of four directions as indicated by arrows 42-45. If the article 11 is moving in the direction of the arrow 42, for example, the two rightmost pins 27 would not have either the pressure source 31 or the vacuum source 32 connected to the chambers 22 while the two pins 27 on the left side would have their connected diaphragms 25 subjected to the vacuum source 32 so that each of these pins 27 would be disposed out of the way prior to the article 11 engaging the two rightmost pins 27.

After the article 11 has struck the two rightmost pins 27 when moving in the direction of the arrow 42, the two leftmost pins 27 have the vacuum removed from their diaphragms 25 so that the two leftmost pins 27 return to the position in which the article 11 rests against the flat sides 30 of the reduced portions 29. In this manner, the article 11 is centered between the reduced portions 29 of the four pins 27. With the article 11 so centered and held by the pins 27, application of pressure to the four diaphragms 25 connected to the four pins 27 could lift the article 11 if desired.

After the article 11 has been centered at its desired orientation by the pins 27, it can then be moved in any of the directions indicated by the arrows 42–45. Thus, if the article 11 is to be moved in the direction of the arrow 45, for example, the two lowermost (as viewed in FIG. 4A) pins 27 must be moved out of the path of the article 11. This is accomplished by applying a vacuum to each of the two diaphragms 25 connected to the two pins 27. Then, the article 11 can be moved in the direction of the arrow 45.

Thus, the arrangement of FIGS. 4A and 4B enables the article 11 to be centered irrespective of which of the directions indicated by the arrows 42–45 that the article 11 is moved by the air of the air slide or track. Of course, different combinations of the pins 27 must be raised and lowered for different directions of motion of the article 11.

Figure 5A:
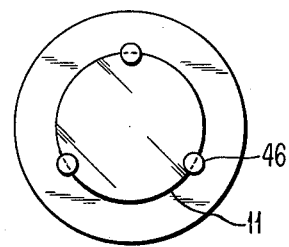
FIG. 5A is a schematic bottom plan view of a plurality of the article handling pins of the present invention for lifting or picking up the article.
Figure 5B:
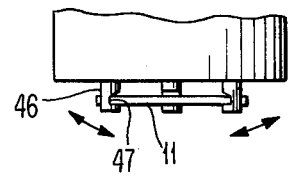
FIG. 5B is a schematic side elevational view of the arrangement of FIG. 5A.

Referring to FIGS. 5A and 5B, there are shown pins 46. Each of the pins 46 is formed with a slot 47 intermediate its ends. Each of the pins 46, which are preferably equally angularly spaced from each other, would be offset with respect to the diaphragm 25 in the same manner as the pin 27 is offset. The pin 46 is preferably formed integral with the diaphragm 25 by which it is supported. Thus, each of the pins 46 has a combination of angular and straight motions.

It should be understood that the pins 46 would be mounted above the article 11 rather than below the article 11 as are the pins 27 and 41. Thus, one of the pins 46 could be utilized to stop the article 11. Then, the other two pins 46 could be swung into engagement with the periphery of the article 11 whereby it could be lifted or picked up.

The pins 46 are retracted through applying a vacuum to act on the connected diaphragms 25 in the same manner as the pins 27. The release of the vacuum causes the pins 46 to engage the article 11. Application of pressure to the diaphragm 25 of each of the pins 46 moves the pins 46 into engagement with the article with a greater force if such is necessary.

After the pins 46 have grasped the article 11, the article 11 is picked up only by movement of a support structure on which the diaphragms 25 are mounted such as a movable arm, for example. Thus, if the article 11 is to be lifted, the support structure must be movable relative to the chamber 10 in this arrangement. However, the pins 46 could be employed to merely support the article 11 in suspended relation to the floor of the chamber 10, for example, so that the pins 46 and their connected diaphragms 25 would not have to be mounted on a movable structure for utility.

While the present invention has shown and described the pins as being disposed above or below the article 11, it should be understood that the pins could be disposed at any angle relative to the article 11. Thus, the pins could be disposed horizontal, for example.

An advantage of this invention is that it prevents damage to a fragile article such as a semiconductor wafer, for example. Another advantage of this invention is that it enables handling of an article without contamination of the chamber in which the article is disposed. A further advantage of this invention is that it has a relatively low cost. Still another advantage of this invention is that it has high reliability. A still further advantage of this invention is there is no rubbing of the edge of the article being handled.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for engaging an article movable in a controlled environment including:

an element selectively movable relative to the article to be engaged to cause said element to selectively engage the article movable in the controlled environment without blocking the controlled environment, the article being movable in a plane transverse to the location of said element and adapted to be positioned during its movement in the plane to a position in which said element can engage the article and then be removed from the position in which said element can engage the article;

means to support said element, said support means isolating said element within the controlled environment, said element being free standing within the controlled environment;

means to move said support means to move said element from a position in which said element cannot engage the article to interfere with movement of the article in the controlled environment in the plane transverse to the location of said element to a position in which said element engages the article to control its position within the controlled environment;

said support means is a diaphragm having one side always communicating with the controlled environment;

and said moving means includes means to produce a fluid pressure differential across said diaphragm by acting on the side of said diaphragm remote from the controlled environment to cause movement of said diaphragm and said element.

2. The device according to claim 1 in which said element is a pin integral with said diaphragm.

3. The device according to claim 2 in which said pin is disposed at the center of said diaphragm and extends from the one side of said diaphragm communicating with the controlled environment.

4. The device according to claim 3 including means to limit the movement of said diaphragm when said producing means produces a pressure differential thereacross.

5. The device according to claim 4 in which said producing means includes:

means to produce a vacuum on the side of said diaphragm remote from the controlled environment to cause movement of said pin away from the controlled environment;

and means to produce a pressure, greater than the pressure within the controlled environment, on the side of said diaphragm remote from the controlled environment to cause movement of said pin toward the controlled environment.

6. The device according to claim 1 in which said element is a pin movable with said diaphragm.

7. The device according to claim 6 in which said pin is disposed in alignment with the center of said diaphragm.

8. The device according to claim 7 including means to limit the movement of said diaphragm when said producing means produces a pressure differential thereacross.

9. The device according to claim 8 in which said producing means includes:
means to produce a vacuum on the side of said diaphragm remote from the controlled environment to cause movement of said pin away from the controlled environment;
and means to produce a pressure, greater than the pressure within the controlled environment, on the side of said diaphragm remote from the controlled environment to cause movement of said pin toward the controlled environment.

10. A device for engaging an article in a controlled environment including:
an element selectively movable relative to the article to be engaged;
means to support said element, said support means isolating said element within the controlled environment;
means to move said support means to move said element from a first position to a second position, said element engaging the article when said element is in at least one of the first and second positions;
said support means is a diaphragm;
said element is a pin movable with said diaphragm;
and said pin is eccentrically disposed relative to the center of said diaphragm.

11. A device for engaging an article movable in a controlled environment including:
an element selectively movable relative to the article to be engaged to cause said element to selectively engage the article movable in the controlled environment without blocking the controlled environment, the article being movable in a plane transverse to the location of said element and adapted to be positioned during its movement in the plane to a position in which said element can engage the article and then be removed from the position in which said element can engage the article;
means to support said element, said support means isolating said element within the controlled environment, said element being free standing within the controlled environment;
means to move said support means to move said element from a position in which said element cannot engage the article to interfere with movement of the article in the controlled environment in the plane transverse to the location of said element to a position in which said element engages the article to control its position within the controlled environment;
said support means is a diaphragm having one side always communicating with the controlled environment;
a plurality of said elements for selectively engaging the article movable in the controlled environment, said elements being disposed relative to each other so that all of said elements can engage the article at the same time;
each of said elements having a separate one of said support means, each of said support means having a separate one of said moving means;
and each of said moving means being selectively effective separately to control the direction of motion of the article within the controlled environment.

12. The device according to claim 10 in which said moving means includes means to produce a pressure differential across said diaphragm to cause movement of said diaphragm.

13. The device according to claim 12 including means to limit the movement of said diaphragm when said producing means produces a pressure differential thereacross.

14. The device according to claim 13 in which said producing means includes:
means to produce a vacuum on the side of said diaphragm remote from the controlled environment to cause movement of said pin away from the controlled environment
and means to produce a pressure, greater than the pressure within the controlled environment, on the side of said diaphragm remote from the controlled environment to cause movement of said pin toward the controlled environment.

15. The device according to claim 10 in which said pin is integral with said diaphragm.

16. The device according to claim 15 including: said moving means including means to produce a pressure differential across said diaphragm to cause movement of said diaphragm and said element; and means to limit the movement of said diaphragm when said producing means produces a pressure differential thereacross.

17. The device according to claim 16 in which said producing means includes:
means to produce a vacuum on the side of said diaphragm remote from the controlled environment to cause movement of said pin away from the controlled environment;
and means to produce a pressure, greater than the pressure within the controlled environment, on the side of said diaphragm remote from the controlled environment to cause movement of said pin toward the controlled environment.

* * * * *